(12) United States Patent
Helvik et al.

(10) Patent No.: US 11,836,142 B2
(45) Date of Patent: *Dec. 5, 2023

(54) INTELLIGENT RANKING OF SEARCH RESULTS

(71) Applicant: Microsoft Technology Licensing, LLC, Redmond, WA (US)

(72) Inventors: Torbjørn Helvik, Oslo (NO); Vegar Skjaerven Wang, Tromsø (NO); Jan Heier Johansen, Tromsø (NO); Jon Meling, Tromsø (NO); Madeline Schuster Kleiner, Bellevue, WA (US); Bernhard Kohlmeier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,324

(22) Filed: May 27, 2022

(65) Prior Publication Data

US 2022/0284031 A1 Sep. 8, 2022

Related U.S. Application Data

(63) Continuation of application No. 16/822,877, filed on Mar. 18, 2020, now Pat. No. 11,392,594.

(51) Int. Cl.
*G06F 7/02* (2006.01)
*G06F 16/00* (2019.01)
(Continued)

(52) U.S. Cl.
CPC ...... *G06F 16/24578* (2019.01); *G06F 16/951* (2019.01); *G06F 16/9538* (2019.01); *G06F 16/335* (2019.01)

(58) Field of Classification Search
CPC ............ G06F 16/24578; G06F 16/951; G06F 16/9538; G06F 16/335
See application file for complete search history.

(56) References Cited

U.S. PATENT DOCUMENTS 6,385,602 B1 * 5/2002 Tso ..................... G06F 16/338
7,853,610 B2 12/2010 Hirsch et al.
(Continued)

OTHER PUBLICATIONS

"Final Office Action Issued in U.S. Appl. No. 16/881,830", dated Nov. 17, 2022, 18 Pages.
(Continued)

*Primary Examiner* — Bruce M Moser
(74) *Attorney, Agent, or Firm* — NovoTechIP International PLLC

(57) ABSTRACT

A method and system for intelligently ranking search results may include receiving a search request containing one or more terms for performing a search, providing the one or more terms for conducting a search, and receiving a search results index containing a list of a plurality of documents, each of the plurality of documents corresponding to one of the one or more terms or to one or more other terms associated with the at least one of the one or more terms. Once the search results index is received, the method and system may access a plurality of properties associated with at least one of the plurality of documents, the plurality of properties including a user category associated with the at least one of the plurality of documents, calculating a relevance score for the at least one of the plurality of documents based on at least one of the plurality of properties, selecting a subset of the plurality of documents for presenting to a user based at least on the calculated relevance score, and providing the subset of plurality of documents for presenting to the user.

20 Claims, 8 Drawing Sheets

(51) Int. Cl.
*G06F 16/2457* (2019.01)
*G06F 16/951* (2019.01)
*G06F 16/9538* (2019.01)
*G06F 16/335* (2019.01)

(56) References Cited

U.S. PATENT DOCUMENTS

| | | | |
|---|---|---|---|
| 7,870,150 | B2 | 1/2011 | Hirsch et al. |
| 8,108,779 | B1 | 1/2012 | Rein et al. |
| 10,042,615 | B2 | 8/2018 | Fredrickson et al. |
| 10,042,616 | B2 | 8/2018 | Fredrickson et al. |
| 11,138,534 | B1 | 10/2021 | Kuhn et al. |
| 11,321,360 | B2* | 5/2022 | Kohlmeier ............ G06N 20/00 |
| 11,328,116 | B2* | 5/2022 | Meling ................. G06N 20/00 |
| 11,522,924 | B2* | 12/2022 | Wang .................. H04L 65/4015 |
| 2005/0086255 | A1 | 4/2005 | Schran et al. |
| 2007/0265994 | A1 | 11/2007 | Ueda |
| 2008/0091656 | A1 | 4/2008 | Charnock et al. |
| 2008/0215616 | A1 | 9/2008 | Hirsch et al. |
| 2008/0281835 | A1 | 11/2008 | Hirsch et al. |
| 2014/0033009 | A1 | 1/2014 | Rein et al. |
| 2016/0379129 | A1* | 12/2016 | Assem Aly Salama ..................... G06Q 30/0282 706/52 |
| 2017/0357661 | A1* | 12/2017 | Hornkvist ............ G06F 16/148 |
| 2018/0025084 | A1* | 1/2018 | Conlan ............. G06F 16/24578 707/734 |
| 2018/0060325 | A1* | 3/2018 | Taylor ............... G06F 16/24578 |
| 2018/0115603 | A1* | 4/2018 | Hu ........................ G06Q 50/01 |
| 2020/0067997 | A1 | 2/2020 | Hardee et al. |
| 2020/0097340 | A1 | 3/2020 | Balik et al. |
| 2020/0159862 | A1 | 5/2020 | Kleiner et al. |
| 2021/0365466 | A1* | 11/2021 | Kleiner ............. G06F 16/24578 |
| 2022/0222279 | A1* | 7/2022 | Kohlmeier .......... G06F 16/9035 |
| 2022/0353307 | A1 | 11/2022 | Wang et al. |
| 2022/0405612 | A1* | 12/2022 | Kleiner .................... G06N 5/04 |
| 2023/0325395 | | 10/2023 | Kleiner et al. |

OTHER PUBLICATIONS

"Non Final Office Action Issued in U.S. Appl. No. 16/881,830", dated Apr. 26, 2022, 18 Pages.

"Non Final Office Action Issued in U.S. Appl. No. 17/243,285", dated Apr. 6, 2022, 7 Pages.

"International Search Report and Written Opinion Issued in PCT Application No. PCT/US22/028881", dated Aug. 12, 2022, 11 Pages.

"International Search Report & Written Opinion issued in PCT Application No. PCT/US22/023231", dated Jul. 1, 2022, 13 Pages.

"Notice of Allowance Issued in U.S. Appl. No. 17/243,285", dated Jul. 29, 2022, 7 Pages.

"Non Final Office Action Issued in U.S. Appl. No. 17/709,948", dated Jun. 30, 2023, 5 pages.

"Notice of Allowance Issued in U.S. Appl. No. 16/881,830", dated Mar. 15, 2023, 13 pages.

"Notice of Allowance Issued in U.S. Appl. No. 17/709,948", dated Oct. 18, 2023, 7 Pages.

"Office Action Issued in European Patent Application No. 20830477.4", dated Sep. 18, 2023, 6 Pages.

* cited by examiner

| Session Start Time 210 | User ID 220 | User Activity Identifier 230 | Session End Time 240 |
|---|---|---|---|
| 2019-03-29 T 09:17:24.135Z | 3be14b38-121f-4c7a-85cf-cc5ee98f35e6 | 30002<br>106<br>30010 | 2019-03-29 T 09:23:35.115Z |

| Document Name 310 | Level of Activity 320 | Lifecycle Stage 330 | User Categories 340 | Session Date/Time 350 | Session Duration 360 |
|---|---|---|---|---|---|
| New Hire Training | Active | Reading | Reader: user F | 2020-01-29 T 09:23:35 | 3:25:16 |
| | | | Reader: user E | 2020-01-25 T 11:35:22 | 1:06:19 |
| | | | Reviewer: user D | 2019-12-21 T 10:15:42 | 0:25:45 |
| | | | Editor: user C | 2019-12-18 T 12:34:15 | 1:34:11 |
| | | | Author: user B | 2019-12-15 T 10:15:42 | 4:16:19 |
| | | | Author: user A | 2019-12-13 T 11:45:16 | 3:25:45 |
| | | | Creator: user A | 2019-12-13 T 10:15:44 | |

FIG. 3A

| Document Name 310 | Relevant Activity 370 | Activity Time 380 | User ID 390 |
|---|---|---|---|
| New Hire Training | Content copied | 2020-01-29 T 09:23:35 | 3be14b38-121f-4c7a |
| | Document shared | 2020-01-25 T 11:35:22 | 3be14b38-121f-4c7a |
| | Link clicked | 2019-12-21 T 10:15:42 | 3be14b38-121f-4c7a |
| | Document shared | 2019-12-18 T 12:34:15 | 3be14b38-121f-4c7a |
| | Document printed | 2019-12-18 T 10:15:42 | 3be14b38-121f-4c7a |
| | Document presented | 2019-12-17 T 11:45:16 | 3be14b38-121f-4c7a |
| | Link clicked | 2019-12-15 T 10:15:44 | 3be14b38-121f-4c7a |

INTELLIGENT RANKING OF SEARCH RESULTS

CROSS-REFERENCE TO A RELATED APPLICATION

This patent application claims the benefit of priority to U.S. application Ser. No. 16/822,877 entitled "Intelligent Ranking of Search Results," filed on Mar. 18, 2020, the entirety of which is incorporated herein by reference.

BACKGROUND

In order to locate a document of interest, users often conduct a document search of a storage medium where they believe the desired document may be stored. With the enormous number of documents stored in typical storage mediums, however, a document search may result in a significant number of search results. This is particularly the case in enterprise settings or other cloud-based storage systems where a significantly large number of documents are stored and accessible to users. Providing a large number of search results to a user may result in the user having to spend a lot of time reviewing the search results to locate the desired document. Moreover, inaccurate and efficient searching may result in the user having to conduct multiple document searches (e.g., entering alternative queries, rephrasing and the like) to find the document the user is seeking. This may lead to user frustration and inefficiency. Furthermore, providing a large number of search results from a search service to a client device and/or conducting multiple searches may require significant memory, processor and bandwidth resources.

Hence, there is a need for improved systems and methods of enhancing intelligent ranking of search results provided to a user.

SUMMARY

In one general aspect, the instant application describes a data processing system for receiving a search request containing one or more terms for performing a search, providing the one or more terms to a search engine for conducting a search, receiving a search results index containing a list of a plurality of documents from the search engine, each of the plurality of documents corresponding to at least one of the one or more terms or to one or more other terms associated with the at least one of the one or more terms, accessing a plurality of properties associated with at least one of the plurality of documents, the plurality of properties including a user category associated with the at least one of the plurality of documents, calculating a relevance score for the at least one of the plurality of documents based on at least one of the plurality of properties, selecting a subset of the plurality of documents for presentation based at least on the calculated relevance score, and providing the subset of the plurality of documents for presentation.

In yet another general aspect, the instant application describes a method for intelligently ranking search results. The method may include receiving a search request containing one or more terms for performing a search, providing the one or more terms to a search engine for conducting a search, receiving a search results index containing a list of a plurality of documents from the search engine, each of the plurality of documents corresponding to at least one of the one or more terms or to one or more other terms associated with the at least one of the one or more terms, accessing a plurality of properties associated with at least one of the plurality of documents, the plurality of properties including a user category associated with the at least one of the plurality of documents, calculating a relevance score for the at least one of the plurality of documents based on at least one of the plurality of properties, selecting a subset of the plurality of documents for presentation based at least on the calculated relevance score, and providing the subset of the plurality of documents for presentation.

In a further general aspect, the instant application describes a computer readable storage media on which are stored instructions that when executed cause a programmable device to receive a search request containing one or more terms for performing a search, providing the one or more terms for conducting a search, receive a search results index containing a list of a plurality of documents, each of the plurality of documents corresponding to at least one of the one or more terms or to one or more other terms associated with the at least one of the one or more terms, access a plurality of properties associated with at least one of the plurality of documents, the plurality of properties including a user category associated with the at least one of the plurality of documents, calculate a relevance score for the at least one of the plurality of documents based on at least one of the plurality of properties, select a subset of the plurality of documents for presentation based at least on the calculated relevance score, and provide the subset of the plurality of documents for presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an example data structure for keeping track of user activity in a document.

FIGS. 3A-3B illustrate example properties retrieved for a document to calculate a relevance score.

DETAILED DESCRIPTION

Figure 1:
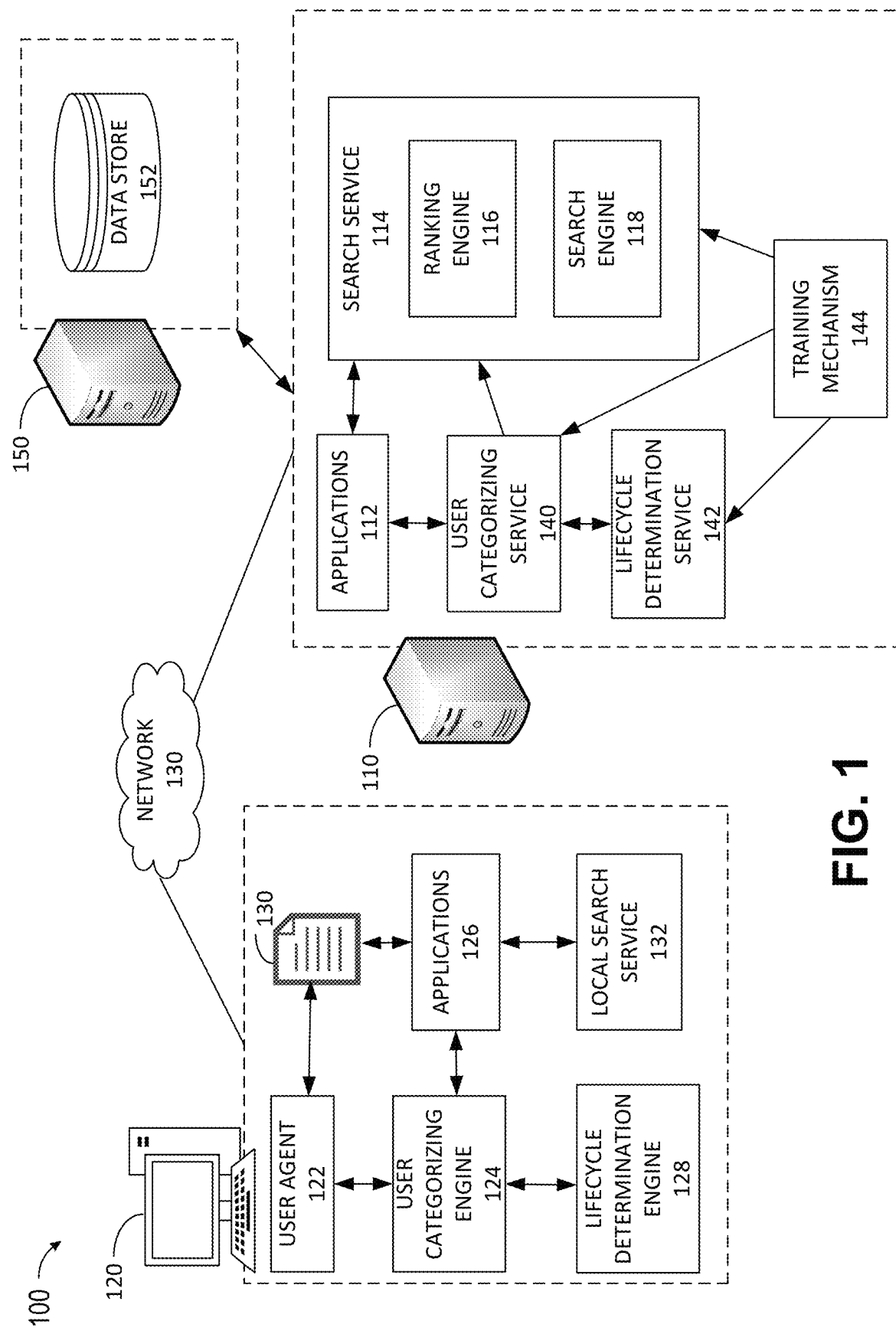
FIG. 1 illustrates an example system in which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the significant number of documents stored in enterprise computer systems, local devices having large storage capacities, and cloud-storage solutions that offer the ability to store a significantly large number of documents, locating a relevant document through a document search has become challenging. That is because, when millions of documents are stored and accessible to a user, a typical document search may result in a significant number of search results. In such instances, providing the entire search results to the user may lead to an extensive amount of time spent by the user reviewing the results to find the desired document. This may also lead to conducting multiple searches (e.g., entering different queries, rephrasing search terms, using different spellings and the like) to locate the document the user is searching for. This process is inconvenient and inefficient for users. Furthermore, processing multiple searches and/or processing a large number of search results may require significant memory, processing and bandwidth needs which may lead to delays.

To reduce the amount of time and resources needed to process and present search results to the user, mechanisms have been developed for identifying and presenting more relevant search results from among the entire search results. This often involves ranking the search results based on their relevance. Once the search results are ranked, a subset of the results that is deemed to be most relevant to the user may be selected for presenting to the user. Current relevance ranking mechanisms may make use of certain contextual information relating to the user to rank search results according to their relevancy. The contextual information may include features such as individuals associated with the user. This contextual information may be used to identify documents in the search results that were last modified or accessed by individuals associated with the user. While this may be helpful in providing some relevancy ranking, it does not provide an accurate representation of all documents the user is associated with or is interested in. This type of relevance ranking merely examines the last access to or the last modification of the document and does not take into account other types of activities that may have occurred with respect to a document. For example, a document that is opened mistakenly and immediately closed may receive the same relevance value as a document that is read carefully for hours, because the only parameter available for examination is the last access to the document. This may result in incorrectly ranking documents and/or providing more search results to the user than necessary. As a result, the search results provided to the user may have the technical problem of not being relevant and as such being unreliable. This may require the user to perform multiple searches to locate their desired document, thus causing inefficiencies for both the user and the system.

To address these technical problems and more, in an example, this description provides a technical solution for intelligently ranking search results based on, among other things, a history of user relationships with a document, a history of certain relevant activities performed on the document, an activity level of the document and/or a lifecycle stage of the document. To do so, techniques may be used for accessing the history of user relationships, the relevant activities performed on the document and the lifecycle stage of documents identified in a search result. To achieve this, information about users' activities in a document may be collected. This information may then be analyzed to determine one or more user categories associated with the document based on users' activities, identify certain activities that are useful for relevance ranking, and determine the activity level and/or lifecycle stage of the document. The determined information may then be transmitted for storage with the document. The information may be stored as metadata for the document and may be added as new properties to the document such that it can be accessed during relevance ranking.

As will be understood by persons of skill in the art upon reading this disclosure, benefits and advantages provided by such implementations can include, but are not limited to, a solution to the technical problems of unreliable and inaccurate search results provided to users and significant time and resources required for conducting multiple searches and/or processing numerous search results until a desired document is located. Technical solutions and implementations provided herein optimize and improve the accuracy of the process of ranking relevant search results. This leads to providing more accurate and reliable search results to users in need of locating documents quickly and efficiently. The benefits provided by these solutions provide more user-friendly applications and enable users to increase their efficiency. Furthermore, because more relevant search results are provided, the solutions may reduce both the number of search results provided and the number of searches conducted to locate a desired result. This can significantly reduce processor, memory and/or network bandwidth usage and decrease time to success.

As a general matter, the methods and systems described herein may include, or otherwise make use of, a machine-trained model to identify data related to a document. Machine learning (ML) generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model in order to identify patterns in user activity, determine associations between tasks and users, identify categories for a given user, and/or identify activities associated with document relevance. Such training may be made following the accumulation, review, and/or analysis of user data from a large number of users over time, and which is configured to provide the ML algorithm (MLA) with an initial or ongoing training set. In addition, in some implementations, a user device can be configured to transmit data captured locally during use of relevant application(s) to a local or remote ML program and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

FIG. 1 illustrates an example system 100, in which aspects of this disclosure may be implemented. The system 100 may include a sever 110 which may contain and/or execute a user categorizing service 140, a lifecycle determination service 142, and a search service 114. The server 110 may operate as a shared resource server located at an enterprise accessible by various computer client devices such as client device 120. The server 110 may also operate as a cloud-based server for offering global user categorizing services, lifecycle determination services and/or search services. Although shown as one server, the server 110 may represent multiple servers for performing various different operations. For example, the server 110 may include one or more processing servers for performing the operations of the user categorizing service 140, the lifecycle determination service 142, and the search service 114.

The user categorizing service 140 may provide intelligent categorization of users' roles with respect to a document over time. This may be achieved by receiving a usage signal from a document, determining based on the information provided in the usage signal one or more user categories for the user, identifying certain activities performed on the document that may be relevant to search services and providing the identified user categories and relevant activities for storage in association with the document. As described further with respect to FIG. 2, the usage signal may include detailed information about the types of activities performed on a document by a user within a given time period.

The lifecycle determination service 142 may provide intelligent determination of a document's lifecycle stage and/or activity level. The lifecycle determination service 142 may receive information relating to the one or more user categories identified by the user categorizing service 140 and determine based on the identified user categories an appropriate lifecycle stage for the document. Furthermore, the lifecycle determination service 142 may determine an appropriate activity level for the document based on the activities received as part of the usage signal.

The search service 114 may conduct intelligent searching of one or more data stores to provide relevant search results in response to a search request. The search service 114 may include a ranking engine 116 for ranking search results based on relevance of the results to the user by taking into account a variety of contextual information and document properties. In one implementation, the ranking engine 116 is integrated with the search service 114. The search service 114 may also include a built-in search engine 118 for executing a search. Alternatively and/or additionally, the search service 114 may utilize one or more external search engines (not shown) for executing a search. In response to a search request, the search engine 118 may conduct a document search of one or more data stores (e.g., data stores specified in the search request) and provide a search results index containing a list of documents to the search service 114. The search service 114 may then provide the search results index to the ranking engine 116 to enable relevance ranking of the search results.

The server 110 may be connected to or include a storage server 150 containing a data store 152. The data store 152 may function as a repository in which documents and/or data sets (e.g., training data sets) may be stored. One or more ML models used by the user categorizing service 140, the lifecycle determination service 142, and/or the search service 114 may be trained by a training mechanism 144. The training mechanism 144 may use training data sets stored in the data store 152 to provide initial and ongoing training for each of the models. In one implementation, the training mechanism 144 may use labeled training data from the data store 152 to train each of the models via deep neural network(s). The initial training may be performed in an offline stage. Additionally and/or alternatively, the one or more ML models may be trained using batch learning.

It should be noted that the ML model(s) categorizing the user activities, determining document lifecycle stages and/or ranking search results may be hosted locally on the client device 120 or remotely, e.g., in the cloud. In one implementation, some ML models are hosted locally, while others are stored remotely. This enables the client device 120 to provide some categorization, lifecycle determination and/or search ranking even when the client is not connected to a network.

The server 110 may also be connected to or include one or more online applications 112. Applications 112 may be representative of applications that provide access to and/or enable creation or editing of one or more documents, as well as searching applications. As such, applications 112 may include an application hosted by the search service 114. Examples of suitable applications include, but are not limited to, a document management application, a file sharing application, a word processing application, a presentation application, a note taking application, a text editing application, an email application, a spreadsheet application, a desktop publishing application, a digital drawing application, a communications application and a web browsing application.

A client device 120 may be connected to the server 110 via a network 130. The network 130 may be a wired or wireless network(s) or a combination of wired and wireless networks that connect one or more elements of the system 100. The client device 120 may be a personal or handheld computing device having or being connected to input/output elements that enable a user to interact with an electronic document 130 on the client device 120 and to submit a search request via, for example, a user interface (UI) displayed on the client device 120. Examples of suitable client devices 120 include but are not limited to personal computers, desktop computers, laptop computers, mobile telephones, smart phones, tablets, phablets, digital assistant devices, smart watches, wearable computers, gaming devices/computers, televisions, and the like. The internal hardware structure of a client device is discussed in greater detail in regard to FIGS. 6 and 7.

The client device 120 may include one or more applications 126. An application 126 may be a computer program executed on the client device that configures the device to be responsive to user input to allow a user to interactively view, generate and/or edit the document 130 and/or to enable the user to conduct a document search. The document 130 and the term document used herein can be representative of any file that can be stored in a storage medium and located via a content search. Examples of documents include but are not limited to word-processing documents, presentations, spreadsheets, notebooks, websites (e.g., SharePoint sites), digital drawings, emails, media files and the like. The electronic document 130 may be stored locally on the client device 120, stored in the data store 152 or stored in a different data store and/or server.

The application 126 may process the document 130, in response to user input through an input device, to create, view and/or modify the content of the electronic document 130, by displaying or otherwise presenting display data, such as a GUI which includes the content of the electronic document 130, to the user. In another example, the application 126 may enable the user to provide input via an input/output element to request a document search of one or more storage mediums. Examples of suitable applications include, but are not limited to a document management application, a file sharing application, a word processing application, a presentation application, a note taking application, a text editing application, an email application, a spreadsheet application, a desktop publishing application, a digital drawing application and a communications application.

The client device 120 may also access applications 112 that are run on the server 110 and provided via an online service as described above. In one implementation, applications 112 may communicate via the network 130 with a user agent 122, such as a browser, executing on the client device 120. The user agent 122 may provide a UI that allows the user to interact with application content and electronic documents stored in the data store 152 via the client device 120. The user agent 122 may also provide a UI that enables the user to conduct a document search. In some examples, the user agent 122 may be a dedicated client application that provides a UI to access documents stored in the data store 152 and/or in various other data stores. A document search may include searching by one or more keywords, natural language, and/or other terms.

In one implementation, the client device 120 may also include a user categorizing engine 124 for categorizing a user's roles with respect to documents, such as the electronic document 130, over time and/or identifying activities performed in documents that may relate to searching. In an example, the local user categorizing engine 124 may operate with the applications 126 to provide local user categorizing services. For example, when the client device 120 is offline, the local user categorizing engine may make use of one or more local repositories to provide categorization of user activities for a document. In one implementation, enterprise-based repositories that are cached locally may also be used to provide local user categorization. In an example, the client device 120 may also include a lifecycle determination engine 128 for determining the current lifecycle stage and/or activity level of a document such as the document 130. The lifecycle determination engine 128 may use the amount and/or types of activities performed on the document within a given time period along with the identified user categories (e.g., received from the local user categorizing engine 124 and/or the user categorizing service 140) to determine which lifecycle stage and/or activity level the document is currently in.

It should be noted that the local user categorizing engine 124 and the user categorizing service 140 may receive usage signals from documents created or edited in a variety of different types of applications 126 or 112. Once usage signals are received, the local user categorizing engine 124 and/or the user categorizing service 140 may reason over the received usage signals regardless of the type of application they originate from to identify appropriate user categories. It should also be noted that each of the search service 114, ranking engine 116, user categorizing service 140, lifecycle determination service 142, user categorizing engine 124, lifecycle determination engine 128, and local search service 132 may be implemented as software, hardware, or combinations thereof.

In one implementation, the client device 120 may include a local search service 132 for conducting a search for documents stored in a local storage medium (e.g., local memory of the client device 120). The local search service 132 may include a local ranking engine and a local search engine. Alternatively, the local search service 132 may make use of the ranking engine 116 and/or search engine 118 for conducting a search of the local storage medium and/or ranking the identified search results for relevance.

When the client device 120 is utilized by a user to submit a search request (e.g., via the user agent 122, applications 112 or applications 126), along with one or more search terms identified in the search request, additional contextual information that may be useful for relevance ranking may also be transmitted to the respective search service (e.g., the local search service 132 or search service 114). The additional contextual information may include information about the user, people, teams, groups, organizations and the like that the user is associated with and/or sites or applications the user frequently visits. The contextual information may also include the degree to which the user is associated with each of the items in the data structure. For example, the contextual information may include a list of people the user has recently collaborated with (e.g. has exchanged emails or other communications with, has had meetings with, or has worked on the same documents with), people on the same team or group as the user, and/or people working on a same project as the user, and the number of times and/or length of time the user has collaborated with or has been associated with each person on the list. This information may be retrieved from one or more remote or local services, such as a directory service, a collaboration service, a communication service, and/or a productivity service background framework.

The searching application (e.g., an application that provides a search option for conducting a search) may retrieve this information to provide the relevant contextual information for the search. The items retrieved may be related to a predetermined period of time (e.g., items may be retrieved for one week or one month preceding the time at which the search request was submitted). In this manner, more recent and likely more relevant contextual information may be collected and used for relevance ranking. Furthermore, once information is retrieved, the items that are most closely associated with the user may be identified. For example, if the user has collaborated with 30 people in the last week, only the top 10 may be included as contextual information for relevance ranking. Alternatively and/or additionally, only the items that meet threshold requirements are included in the contextual information. For example, only people with which the user has collaborated more than a threshold number of times (e.g., more than 5) may be included. The threshold number may be predetermined or may dynamically change based on one or more factors. In one implementation, the threshold number may be identified by one or more ML models.

In some embodiments, once the contextual information is retrieved for a user, it is stored locally and/or remotely and updated as needed (e.g., periodically or when it is determined that one or more changes relating to the contextual information have occurred). For example, a person's degree of association with the user may change if a new group of people have interacted with the user or with documents and/or sites associated with the user more frequently in recent times. Additionally and/or alternatively, a time decay of the degree of association for each item of contextual information may be implemented. For example, a person's degree of association may be continuously decreased if the person has not interacted with the user or with documents and/or sites associated with the user over a particular period of time.

Once the contextual information is retrieved and/or updated as needed, it can be submitted along with any search requests received from the user and/or retrieved from a data store by the search service upon receiving the search request. After the contextual information is submitted, the search service (e.g., local search service 132 or search service 114) may determine a relevance value for items of contextual information based on the degree with which an item is associated with the user, among other factors. In one implementation, the relevance value is determined by using one or more ML models that take into account how various items may relate to relevance of search results. In an alternative implementation, the relevance value is determined by the searching application and submitted as part of or separately from the contextual information to the search service. The relevance value may be based on an order of connection, or a closeness of relationship, between each item and the user.

In one implementation, the contextual information may be generated by the search service. For example, upon receiving a search request from a user, the search service may retrieve information associated with the user from a directory service, a collaboration service, a communication service, and/or a productivity service background framework. The search service may then calculate the relevance value based on an order of connection between each item retrieved and the user. In an alternative implementation, the contextual information may be stored in an external data store and retrieved by the search service.

Once the search service 114 or 132 has received a search request and the contextual information (or has generated the contextual information) and the relevance values have been determined, the search service 114 may submit a search request to the search engine 118 (or to an external search engine). The request may include a search query containing one or more terms for which a search should be conducted.

In one implementation, in addition to one or more search terms received from the user, the search terms submitted to the search engine 118 may include associated words such as synonyms, alternative spellings, and/or semantically similar words. Alternatively, the search engine 118 may receive the one or more search terms submitted by the user and identify one or more words associated with the search terms (e.g. by using a natural language processing model) to include in the search. Furthermore, the search request may include a designation of the data stores which should be searched using the terms.

In response, the search engine may return a search results index containing a list of documents. The list may include documents that are related to one or more of the terms specified in the search request and/or other terms associated with the search terms. The other terms associated with the search terms may include alternative spellings (e.g., when a term that is being searched for includes a misspelling, the search engine may also search for the correct spelling), synonyms, one or more terms commonly used with the search terms, and the like. For each document in the list, the search results index may include one or more properties of the documents. These properties may include the user categories, lifecycle stages, activity level and/or relevant activities performed on each document, as further discussed below.

When searching large data stores, the search results index may contain numerous documents. If the search service 114 were to submit all of the search results to the client device 120, a significant amount of memory, processing power and bandwidth may be needed. Furthermore, once the results are presented to the user, it may take the user a significant amount of time to review all the results and find the desired document. To mitigate this, the present techniques utilize the ranking engine to rank the documents in the search results index based on their relevance to the user.

The ranking engine 116 (or the local ranking engine) may then compare the contextual information with the properties of the documents in the search results index to identify documents in the search results index that correspond with the contextual information. For example, the ranking engine may determine based on the contextual information that the last reader of a document in the search results index is a person associated with the user or that a document in the search results index was shared one or more times between two people associated with the user. The ranking engine may then compute a relevance score for one or more documents based on the comparison, among other factors, and subsequently rank the search results based on the computed scores. In some embodiments, the relevance scores may be calculated based on the relevance value for a property associated with the user and a weight of the associated property. For example, if the contextual information identifies an individual that has a relevance value of 3.2 and is an editor of a document within the search results index, where the editor property has an associated weight of 0.5, to calculate the relevance score, the ranking engine 116 may multiply the relevance value of the person (3.2) by the weight of the associated document property (0.5) to arrive at a value of 1.6. The value of 1.6 may be one of many values included in the computation of the relevance score of the document. Once the relevance score is computed, the document may then be ranked among other documents within the search results index, based on the calculated relevance score. Depending on the number of documents in the search results index, a portion of (or a specific number of) the documents in the search results index having the highest scores may be provided to the user as the search results. In one implementation, the relevance scores may also be used in prioritizing the search results presented to the user, with the documents having higher relevance scores being displayed higher in the list.

Thus, in order to provide relevant search results to the user, the relevance ranking mechanisms take into account a history of document usage. To achieve this, users' roles with respect to a document are identified, such as when a user accesses or makes modifications to a document. This process is discussed in detail in U.S. patent application Ser. No. 16/746,581, entitled "Intelligently Identifying a User's Relationship with a Document," and filed on Jan. 17, 2020 (referred to hereinafter as "the '581 application"), the entirety of which is incorporated herein by reference.

As discussed in the '581 application, content creation/editing applications often provide numerous commands for interacting with a document. These commands may each be associated with a toolbar command identifier (TCID). In addition to offering various commands, applications may also enable user activities such as typing, scrolling, dwelling, or other tasks (i.e., non-command activities) that do not correspond to TCID commands. Each of the commands or non-command activities provided by an application may fall into a different category of user activity. For example, commands for changing the font, paragraph, or style of the document may be associated with formatting activities, while inserting comments, replying to comments and/or inserting text using a track-changes feature may correspond with reviewing activities.

To categorize user activities, commands and non-command activities provided by an application may be grouped into various user categories. The user categories may then be used to identify one or more attributes (e.g., usage roles) for a user at a certain time. An initial set of user categories may include creators, authors, moderators, reviewers, and readers. Other categories may also be created. For example, a category may be generated for text formatters. Another may be created for object formatters (e.g., shading, cropping, picture styles). Yet another category may be created for openers, which may include users who merely open and close a document or open a document but do not perform any substantial activities, such as scrolling or otherwise interacting with the document.

To determine user categories and/or identify user activities that relate to search relevance, data representing commands used by the user to interact with the document may be collected and analyzed. This may involve tracking and storing (e.g., temporarily) a list of user activities and commands performed in a document in a local or remote data structure associated with the document to keep track of the user's activity and command history.

FIG. 2 depicts an example data structure 200, such as a database table, for keeping track of user activity within a session. For example, data structure 200 may include a session start time 210 and a session end time 240. The session start time 210 may be marked as the time the user opens a document and/or the time the user returns to an open document after an idle period. The session end time 240, on the other hand, may be marked as the time the document is closed or the time the last user activity occurs before the document becomes idle. In between the session start time 210 and the session end time 240, the data structure 200 may be used to keep track of user activities by recording activity identifiers 230 (e.g., TCIDs) associated with each separate user activity. Furthermore, in order to identify the user who performs the activities, the data structure 200 may store the user ID 220 of the person interacting with the document.

Once a determination is made that a session end time has been reached, the information collected during the session may be transmitted as part of a usage signal to the user categorizing service or engine for identifying one or more categories for the user for the corresponding session and/or one or more activities performed on the document that relate to search relevance. The usage signal may be a high-fidelity signal which includes detailed information about the types of activities performed on the document within a given time period.

To reduce load, the usage signal may be transmitted per session or on another periodic basis. In order to determine whether a session is an active session (e.g., the session does not include idle time where a user stops interacting with a document for an extended period of time), the application may keep track of the amount of time passed between user activities. For example, if there has been no user activity in an open document or if the window containing the document is out of focus for a given time period (e.g., 10 minutes), the application may determine that an active session has ended. This may result in the application identifying the time at which the last user activity occurred as the session end time. The length of an active session may also be tracked and stored as an item related to search relevance. For example, an active session length may relate to activities such as reading or reviewing where the amount of time spent on the document may be associated with the importance of the document to the reader or reviewer (e.g., if the last person who read the document spent a significant amount of time actively reading the document, it is likely that the document was important to the reader).

Once the usage signal containing the user activity information is transmitted (e.g., upon a document closure or end of a session), the categorizing service may analyze the user activity and perform an intelligent grouping of the activity to identify categories to which the user's activity may belong. The categorizing may be done based on the number of user activities and the categories to which they belong. The determination may be made based on the number and/or portion (e.g., percentage) of user activities associated with each category. For example, if a significant majority of the user's activities falls in one category, the second category may be ignored (e.g., 95% of activities relate to reading, but the user also added a period to the body of the content). The determination may also depend on the most prominent user category. For example, if the majority of the user's activities relate to authoring, but the user also performs moderator activities such as changing the font and paragraph numbering, the moderator activities are likely part of the process of authoring (e.g., the author often also edits the document) and as such may be overlooked. Identification of the most relevant user categories may be made by utilizing an ML model that can intelligently identify the most relevant categories for each user session.

In addition to identifying the user categories for each session, the list of user activities performed in the document may be examined to identify activities that may be related to search relevance. Certain activities performed on a document may signify the importance and/or usefulness of the document to other users. For example, clicking on a link within the document, copying content (e.g., text, drawings, or images) from the document, printing the document, or presenting the document in a meeting may indicate that the document was useful and/or of significance to the user. Thus, when such actions have been taken with respect to the document, the likelihood that the document may be relevant to a searching user may be increased.

To take this information into account, a list of relevant activities may be generated. Relevant activities may include activities performed on the document that are important, useful and/or otherwise related to search relevance. In one implementation, this is achieved by utilizing one or more ML models. For example, when search results are presented to users, user feedback (e.g., explicit feedback or implicit feedback such as usage data) may be collected to determine which documents in the search results the users found most useful and correlate those documents with activities performed within them to identify relevant activities. The user feedback may provide an initial and ongoing training data set that is updated as more information is collected. In one implementation, this may involve collecting and using information that may be relevant to individual users. For example, different activities may signify different levels of importance for each user. User interactions with search results may thus be collected and examined to provide personalized relevance determinations for each user.

In addition to utilizing the user's feedback, feedback data from other users that are similar to the current user may also be employed. In an example, the model may use feedback data from users with similar activities, similar work functions and/or similar work products. The data consulted may be global or local to the current device. It should also be noted that in collecting and storing any user activity data and/or user feedback, care must be taken to comply with all privacy guidelines and regulations. For example, user feedback may be collected and/or stored in such a way that it does not include any user identifying information and is stored no longer than necessary. Furthermore, options may be provided to seek consent (opt-in) from users for collection and use of user data, to enable users to opt-out of data collection, and/or to allow users to view and/or correct collected data.

To ensure that relevant activities are identified correctly for each user, the one or more models for generating a list of relevant activities may include a personalized mode, a global model and/or a hybrid model. Some activities may be determined to be relevant activities across the population. For those activities, a global model may be used to identify the relevant activities. The global model may identify activities relevant to a large number of users and average those relevant activities over all users. Other activities may only be relevant to specific users. For example, if a user often changes the font after opening a document or often searches for documents presented in meetings, changing the font or presenting the document in a meeting may be considered relevant activities for that user. A personalized model can identify such personalized relevant activities. A hybrid model may be used to identify relevant activities for users that are associated with and/or similar to the user. By using a combination of personalized, hybrid and/or global models, better relevant activities may be identified for a given user. Using ML models that are offered as part of a service may ensure that the list of relevant activities can be modified iteratively and efficiently, as needed, to continually train the models. However, a local relevant activity identifying engine may also be provided.

Once the list of relevant activities has been generated and/or modified, the list of relevant activities may be compared against user activity identifiers received as part of the usage signal (e.g., user activity identifier 230 of data structure 200) to determine if any activities performed on the document are on the list of relevant activities. In one implementation, this is performed by the user categorizing service or engine. Alternatively, a separate service or local engine may be utilized for determining if relevant activities have been performed on a document within an active session. The separate relevant activity identifying service or local engine may be associated or incorporated with the search service or may function separately from the service search. When a separate relevant activity identifying service or local engine is used, the usage signal may be sent to the relevant activity identifying service or local engine, each time it is sent to the user categorizing service.

In addition to using the usage signal, the relevant activity identifying service or local engine (or the user categorizing service or engine) may also retrieve and use information from other sources, such as one or more applications or other documents, to identify relevant activities. For example, if the relevant activity is presenting the document in a meeting, information may be retrieved from a virtual conferencing application utilized to present the document. Alternatively and/or additionally, activities within the document may be correlated with information from other applications or other documents to determine if an activity qualifies as a relevant activity. For example, when the activity is entering a presentation mode of the document, this may be correlated with the user's calendar and/or email application to determine if the presentation corresponds to a meeting and as such was a true presentation as opposed to a practice or accidental one. Similarly, when the relevant activity involves sharing the document, information about such an activity may be provided by communication applications (e.g., an email application, a messaging application, or a collaborative work environment application). Information about printing a document may be retrieved/provided by a document management application from which a document may be printed. When the relevant activity is copying content, the activity may be correlated with activities received from other documents used by the user to determine if the content was pasted into another document. This may be done to ensure that a copy activity was in fact used to copy content to a different document.

After relevant activities are identified for a session, they may be sent along with, as part of, or separately from a user category signal to a storage medium for storage. Both the user category signal and the relevant activities may be stored for future use in determining the document's relevance in search results. The process of storing the user category signal and the relevant activities may involve sending the user category signal and the relevant activities back to the client device (or any other device on which the document is stored) via the network. The relevant activities sent for storage may include the user activity identifier, document ID, user ID, and/or activity date and time.

In one implementation, the user category signal may include the user category, the document ID, user ID, session date and time, and/or session length. The user category may be the category identified as being associated with the user's activity. The possible categories may include one or more of creator, author, reviewer, moderator, and reader. The document ID may be a file identifier that can identify the document with which the user activity is associated. This may enable the user category signal information to be attached to the file. In one implementation, the user category signal information is stored as metadata for the file. The user ID may identify the user who performed the user activities during the session. This may enable the system to properly attribute the identified category of operations to the identified user. The session length may be the length of the active session and may be stored and used as a property related to relevance of the document.

In one implementation, once the user category signal is available, it may be sent to the lifecycle determination service and/or the local lifecycle determination engine for determining the document's current lifecycle stage. In addition to the user category signal, the lifecycle determination service and/or the local lifecycle determination engine may receive data relating to the types and quantity of activities performed in the document within a given time period (e.g., the last active session or the last few active sessions). The lifecycle determination service and/or the local lifecycle determination engine may use the activity data to determine a level of activity for the document. This may be done by examining the number of activities (e.g., command and non-command tasks) within a given period and determining where the activity level falls among a variety of predetermined levels of activity (e.g., non-active, low activity, active, very active, extremely active).

To determine the level of activity, in addition to the number of activities performed, the types of activities may also be taken into consideration. Some activities may be more important than others within the context of the application. For example, in a word-processing application, pressing the delete button multiple times to delete a sentence may result in a larger number of activities than pasting a paragraph into the document. However, pasting the paragraph may be more important or substantial than deleting a sentence. To address this, different weights may be assigned to each activity in an application. The weights may be predetermined or may be set by one or more ML models used to identify the importance of each activity within the application. In some embodiments, once the weights are determined, the lifecycle determination service and/or the local lifecycle determination engine may calculate a weighted sum of the activities. The weighted sum may then be compared to predetermined activity levels (e.g., non-active, low activity, active, very active, extremely active) to determine which activity level the weighted sum falls into. It should be noted that the level of activity may change with time. For example, a document may have been identified as very active the last time it was modified. That same document may not be used for an extended period of time after the last modification. To more accurately capture the current activity level of the document, in one implementation, a mechanism may be used that considers both the level of activity and the amount of time that has passed since the last activity and updates the activity level accordingly.

Once calculated and/or updated, the activity level may then be used in determining the relevance of the document to a searching user when a search is performed. For example, if a document is identified as being extremely active, that document may be identified as more relevant to the searcher than one that is non-active.

In addition to the activity level, the lifecycle determination service and/or the local lifecycle determination engine may also determine a lifecycle stage for the document based on the user category signal, activity level, or both. In one implementation, this may involve examining the user category included in the user category signal to determine a lifecycle stage the user category corresponds with. In an example, the lifecycle stages of the document may correspond with the user categories and may include creation, authoring, editing, reviewing, and reading, among others. For example, when the user signal indicates that the identified user category is the reviewer, the lifecycle stage may be identified as the reviewing stage. Alternatively or additionally, the activity level of the document may be taken into account when determining the lifecycle stage. For example, if a correspondence between activity levels and the stages of the documents has been shown (e.g., the editing stage corresponds with high activity), the activity level may be considered to identify the lifecycle stage.

The user category signal, the activity level, the lifecycle stage and/or relevant activities that are identified in a session may be sent to the storage medium to be stored, e.g., in a folder such as a signals folder for future use. In an example, new properties for the document may be stored (e.g., in a folder associated with the document or the signals folder) based on the user category signal, the activity level, the lifecycle stage and/or relevant activities. The properties may be configured for propagation to secondary documents, in whole or in part. In this manner, a copy made of the document may inherit some or all of the properties of the original document.

When a search engine provides a search results index containing a list of documents, the ranking engine may retrieve the properties stored for each document on the list to calculate a relevance score for each document. FIGS. 3A-3B depict example properties associated with a document that may be used to calculate its relevance score. FIG. 3A illustrates a data structure 300A, such as a database table, containing factors that may be related to the document's relevance in search results. Data structure 300A may include a document name 310, a level of activity 320 and a lifecycle stage 330. The document name 310 may be the file name utilized to store the document. Alternatively, the document name may be a document ID (e.g., a file identifier that is different than the file name) used to identify the document. In one implementation, the document name includes information about the location at which the document is stored. Alternatively or additionally, the properties retrieved may include a link to the storage location at which the document is stored.

The level of activity 320 may contain the most recent level of activity identified for the document, which may indicate how active the document is and may be associated with a weight (not shown) used in calculating the relevance score for the document. The lifecycle stage 330 may contain the most recent identified lifecycle stage of the document. The lifecycle stage may provide additional information for determining the relevance of the document. Each lifecycle stage may be associated with a respective weight (not shown).

The data structure 300A may also include user categories 340 which contains a history of user categories identified for the document along with information relating to the user associated with each user category. For example, the user categories 340 may include the categories that have been identified for the document since its creation or for a particular time period and may include a user ID associated with each identified category. In one implementation, all of the user categories may be used in calculating the relevance score. Alternatively, one or more of the more recent user categories may be utilized. The different user categories may be associated with different relevance values or different weights. For example, reading may have a higher weight than creating. To allow for weighting each user category according to its recency, the data structure 300A may also include the session date/time 350 for each identified user category. The session date/time 350 may be associated with a weight given to the user categories (e.g., different weights may be given to session date/times that fall within different time periods). For example, a session date/time that falls within a 24-hour time frame of when the search was conducted may receive a higher weight than a session date/time that occurred two months before the search was conducted.

Another factor that may be used to determine the relevance of the document is the session duration 360. The session duration 360 may provide a session length for each session, when applicable. The session duration 360 may only apply to activities where the amount of time spent on the activity relates to the importance of the application. For example, the amount of time creating a document (e.g., creating a blank document and storing it) may not be relevant and as such may not be stored and/or retrieved. The session duration, when provided, may directly relate to the utility of the document. As such, the session duration may have a weight associated with it for calculating the relevance score.

FIG. 3B illustrates a data structure 300B, such as a database table, for storing a list of relevant activities for a given document. Data structure 300B may include a document name 310, relevant activities 370, activity times 380 associated with each relevant activity 370 and user IDs 390 associated with each relevant activity 370. As discussed with respect to FIG. 3A, the document name 310 may be the file name utilized to store the document or a document ID used to identify the document. The relevant activities 370 may include one or more activities performed on the document that qualify as relevant activities. As discussed above, the types of activities in various applications that relate to relevance of a document may be predetermined. Once information about activities performed with respect to a document is received (e.g., via the usage signal), relevant activities are identified by comparing the list of activities performed in the document with the predetermined types of activities identified as being relevant. These activities are then stored as properties of the document and may be retrieved and/or accessed when needed (e.g., when performing search results ranking).

Each relevant activity 370 may be associated with a weight (not shown). The weight may be predetermined for each activity and may relate to the likelihood of the activity indicating that the document is relevant. The activity time 380 may also be associated with a weight (not shown) for calculating the relevance score of the document. Alternatively or additionally, the weight of a relevant activity may be multiplied by the relevance value of the user 390 performing the activity and the resulting number may be used as one of the factors in calculating the final relevance score of the document.

A relevant activity, such as those illustrated in the relevant activity 370, may be used in ranking the document at multiple different levels, each of which may correspond to different weights. These levels include personal, collaborative and/or global. At the personal level, the relevant activity may indicate that the searching user has performed the relevant activity. At the collaborative level, the relevant activity may have been performed by people associated with the searching user (e.g., one or more people the searching user works with have printed the document). At the global level, the relevant activity may indicate that a large number of people (regardless of whether they are associated with the user or not) may have performed the relevant activity.

In one implementation, each property having a weight may be multiplied by a relevance value and the relevance score may be calculated as a weighted sum of the relevance values. For example, for a document having a high level of activity, a user category of reader with a recent and long session duration and a recent relevant activity, the relevance score may be calculated by multiplying the relevance value associated with the user with the weight associated with the high level of activity, the weight associated with the reader category, the weight associated with a long session, the weight associated with a recent session, and the weight associated the recent relevant activity. The relevance score may then be calculated by adding the weighted relevance values together to arrive at the final score. Many other factors may also be used in calculating the relevance score.

Figure 4:
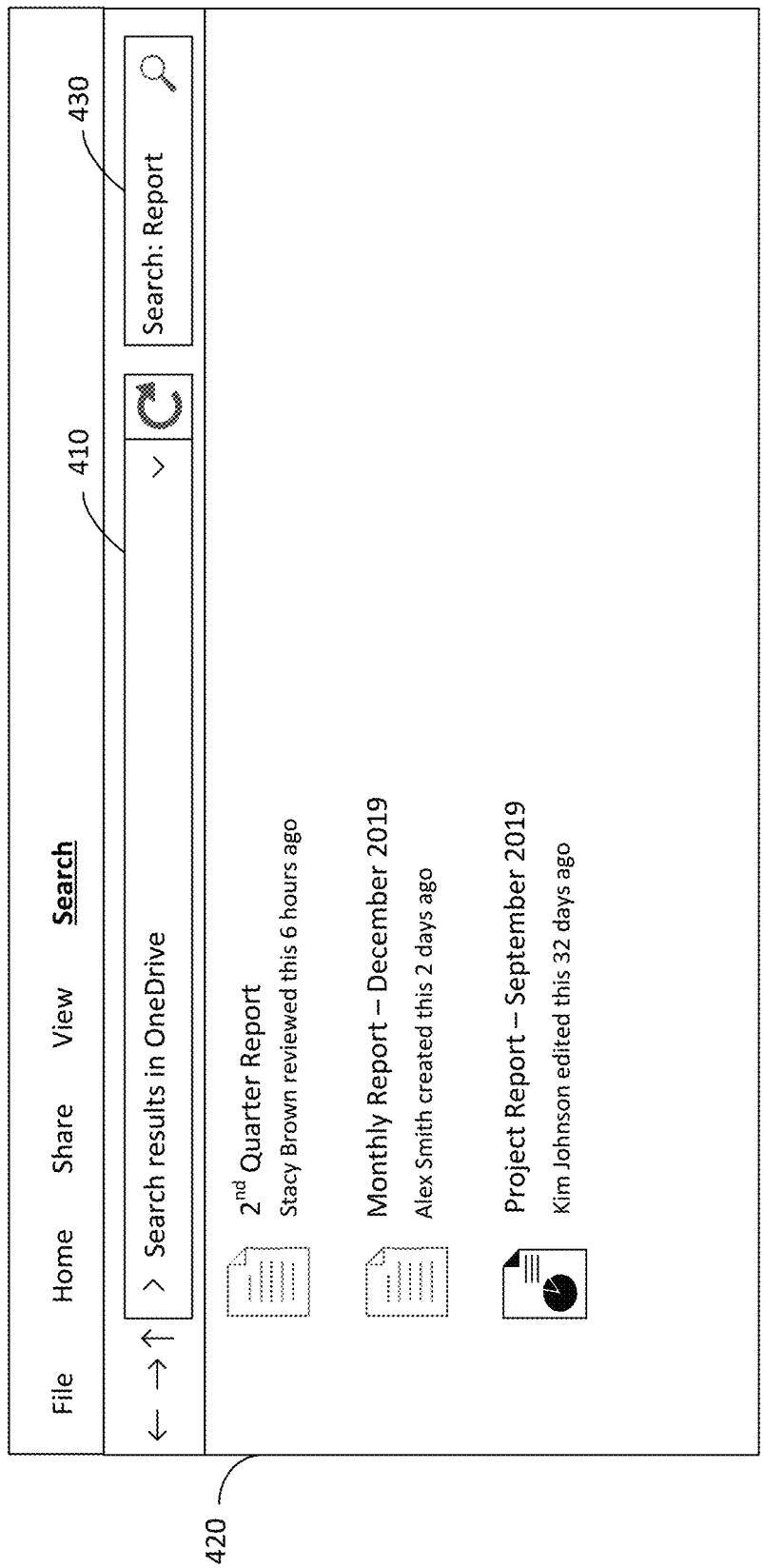
FIG. 4 is an example graphical user interface (GUI) screen for displaying search results to a user.

Once the relevance scores are calculated for one or more documents in the search results index, those identified as meeting a search ranking threshold requirement and/or having higher relevance scores may be presented as search results to the user. FIG. 4 illustrates an example GUI screen for displaying search results to a user. In an implementation, the GUI screen 400 may represent a UI element for accessing documents stored in a local and/or remote storage medium. The GUI screen 400 may include a dropdown or selection box 410 for displaying the location of the file folder being searched and an input box 430 for entering one or more search terms.

Once one or more search terms are entered into the input box 430 and a search is initiated, the techniques may be employed to search for the entered search term(s) (or one or more terms associated with the entered search terms) in the location identified in the dropdown box 410. After one or more search results are identified as meeting the search ranking threshold or having the highest relevance scores, they may be displayed in the display area 420 of screen 400. In one implementation, the search results may include an indication (e.g., icon) for the type of document located, along with the name of the document. Furthermore, the user category information from the document properties may be used to provide relevant and current information to the user about the latest status of the identified documents. Thus, information may be provided about the user who last modified or used the document, as well as the type of activity the user performed on the document. For example, when the search term "report" is used to search for documents in the "OneDrive" folder and three search results are identified, information may be provided about the type of operation most recently performed on each of the identified search results and by which user. Other relevant information may also be displayed for each of the result results. Displayed information may include the most recent level of activity of each document, the lifecycle stage of the document, duration of the last active session, and/or the relevant activities performed on the document within a predetermined period of time. For example, the displayed information for the first result provided in display area 420 may include "Sue Jones printed page 3 four days ago."

In this manner, the techniques may provide a significant advantage over currently used mechanisms of providing information about search results. Currently, most applications that offer search results simply identify the date of the last modification. However, because they cannot determine the type of activities users performed on the document, they cannot differentiate between a user that made significant changes to the document and one that simply corrected a typo while reading the document. In both instances, according to conventional techniques, the user may be identified as the last modifier of the document. This may be misleading and inaccurate, as the latter reader did not make any significant modifications to the document. By identifying the type of category of operation the last user performed on the document, more accurate and relevant information may be provided with search results. In an example, in addition to the last user and the type of operation they performed, the time the last operation was performed may be displayed as an absolute date and time and/or with respect to the current time (e.g., a certain number of hours, days, or months ago). Using a reference to the current time may provide a more user-friendly frame of reference than simply including the absolute time and date. For example, by stating that the document was last reviewed by Stacy Brown 6 hours ago (instead of providing the time and date it was reviewed), the user can more readily see how recent Stacy's activities were. Alternatively or additionally, the actual time and date may be displayed, such as based on user preference.

Figure 5:
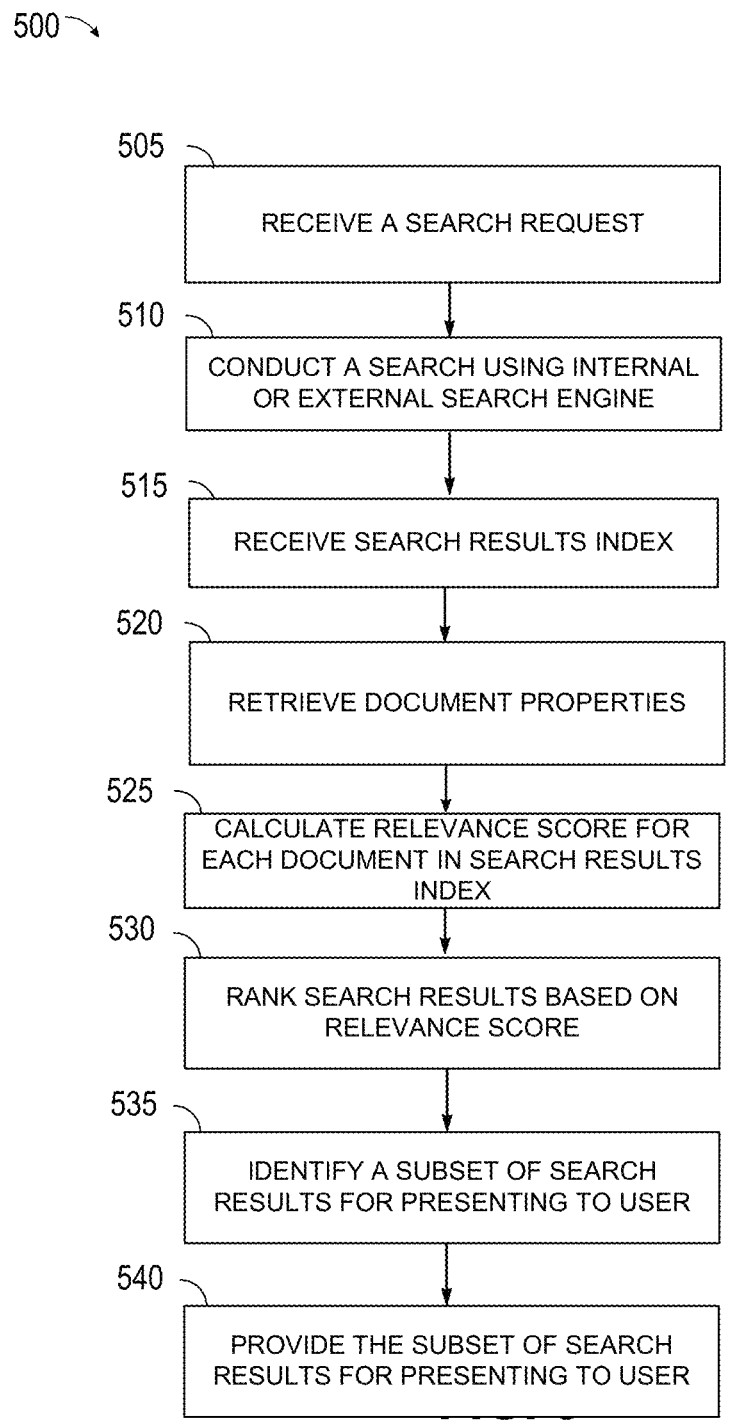
FIG. 5 is a flow diagram depicting an exemplary method for intelligently ranking search results based on, among other things, properties of documents identified in search results.

FIG. 5 is a flow diagram depicting an exemplary method 500 for intelligently ranking search results based on, among other things, properties of documents identified in the search results. The method 500 may be performed by a local or global search service. At 505, method 500 may begin by receiving a search request. This may occur, for example, by receiving a request from an application that provides a search option. The user may utilize a UI provided by the application to enter one or more terms for searching. The application may then transmit the search request to the local or global search service. The search request may include the one or more terms entered by the user. Additionally, the search request may identify a storage location at which the search should be conducted. The storage location may be identified by the user or may be determined by the application providing the search option. Alternatively, no search location may be included in the search request, in which case, the search service may determine an appropriate data store for conducting the search.

In one implementation, in addition to the terms and the search location, the search request may include contextual information or a pointer to such contextual information. The contextual information may include information about the user; people, teams, groups, organizations and the like that the user is associated with; sites or applications the user frequently visits; and/or the degree with which the user is associated with items of contextual information.

After receiving the search request, method 500 may proceed to conduct a search for the one or more terms (and one or more other terms associated with the terms, as discussed above) using an internal or external search engine, at 510. This may be achieved by transmitting a search request which includes the one or more terms and the storage location which should be searched to the internal or external search engine. The search engine may then conduct the requested search at the identified location and provide the search results in a search results index to the search service. Thus, method 500 may receive the search results index, at 515.

Upon receiving the search results index, method 500 may proceed to retrieve or access document properties that are related to search relevance for each of the documents included in the search results index, at 520. These document properties may include those discussed with respect to FIGS. 3A-3B such as document activity level, document lifecycle stage, user categories associated with the document, session time, session duration, relevant activities performed on the document, activity time and/or a user ID associated with each session or relevant activity. These document properties may be used along with the contextual information list to calculate a relevance score for each document in the search results index, at 525. This may be achieved by utilizing one or more ML models. For example, ML model(s) may be used to determine an appropriate relevance value and weight for each property. The relevance values may then be multiplied by their respective weights and added together to calculate the final relevance score for each document. It should be noted that the ML model(s) used may be personalized, global and/or hybrid, as discussed above.

The calculated relevance scores may then be used to rank the documents in the search results index, at 530. Ranking may involve sorting the search results index based on the relevance scores. This may involve, for example, sorting the results such that documents having the higher relevance scores are listed higher in the search results. Once the documents in the search results index are ranked, method 500 may proceed to identify a subset of the documents in the search results index for presentation to the user, at 535. This may be performed to ensure more relevant documents are presented to the user. In one implementation, the process of identifying a subset of documents may involve determining if the total number of documents in the search results index exceed a predetermined number. If the total number exceeds the predetermined number, a portion or number of the documents may be selected as the subset of search results for presenting to the user. When the total number does not exceed the predetermined number, however, the entire search results index may be identified for presenting to the user.

After a subset has been identified for presenting to the user, the subset may be provided to the searching application for displaying to the user, at 540. This may be achieved by sending the subset of search results along with their identified ranking (e.g., their relevance score and/or relative position). In this manner, the results may be presented to the user according to their calculated relevance score such that documents having higher relevance scores are displayed higher in the search results list.

Figure 6:
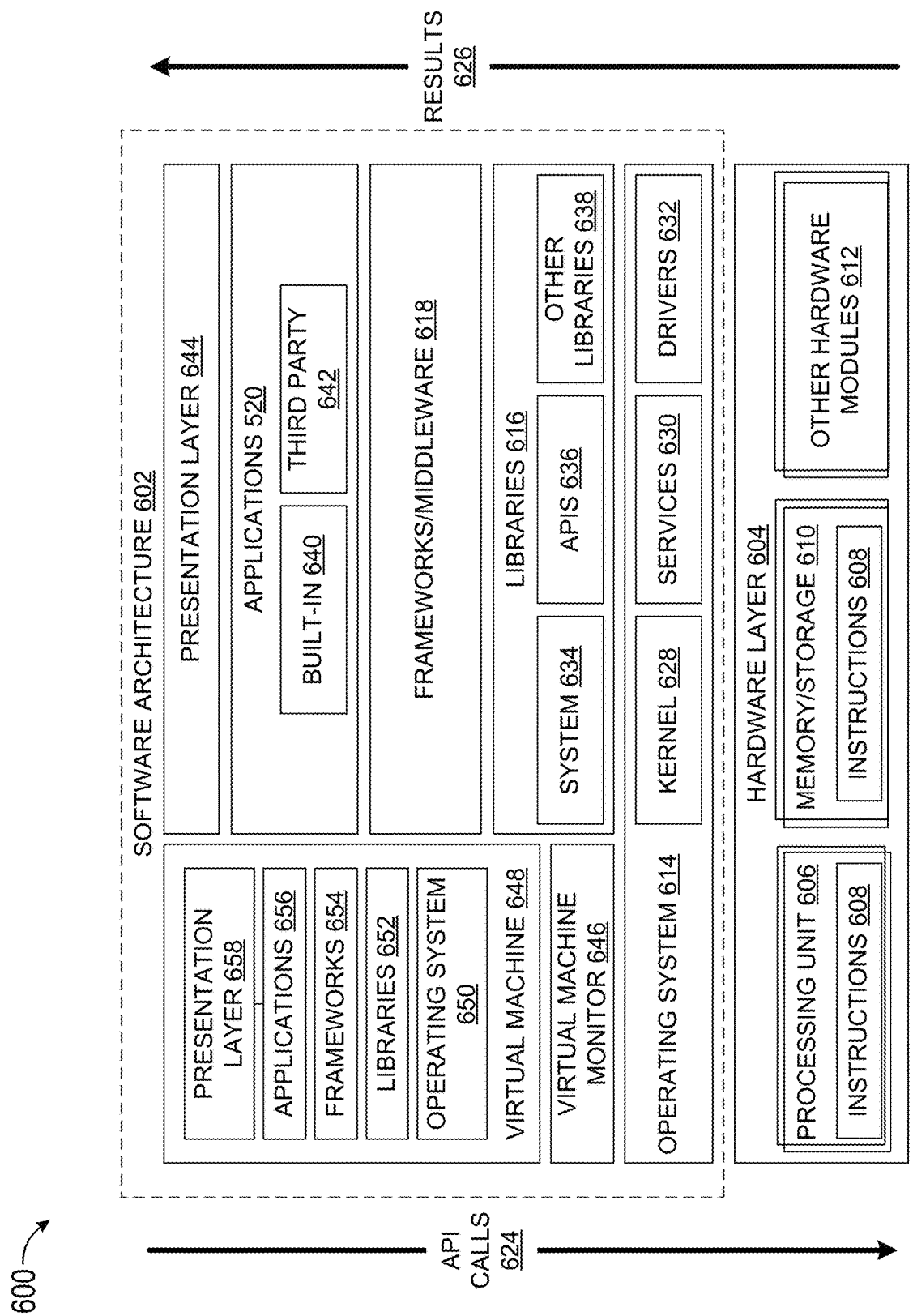
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various GUI functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
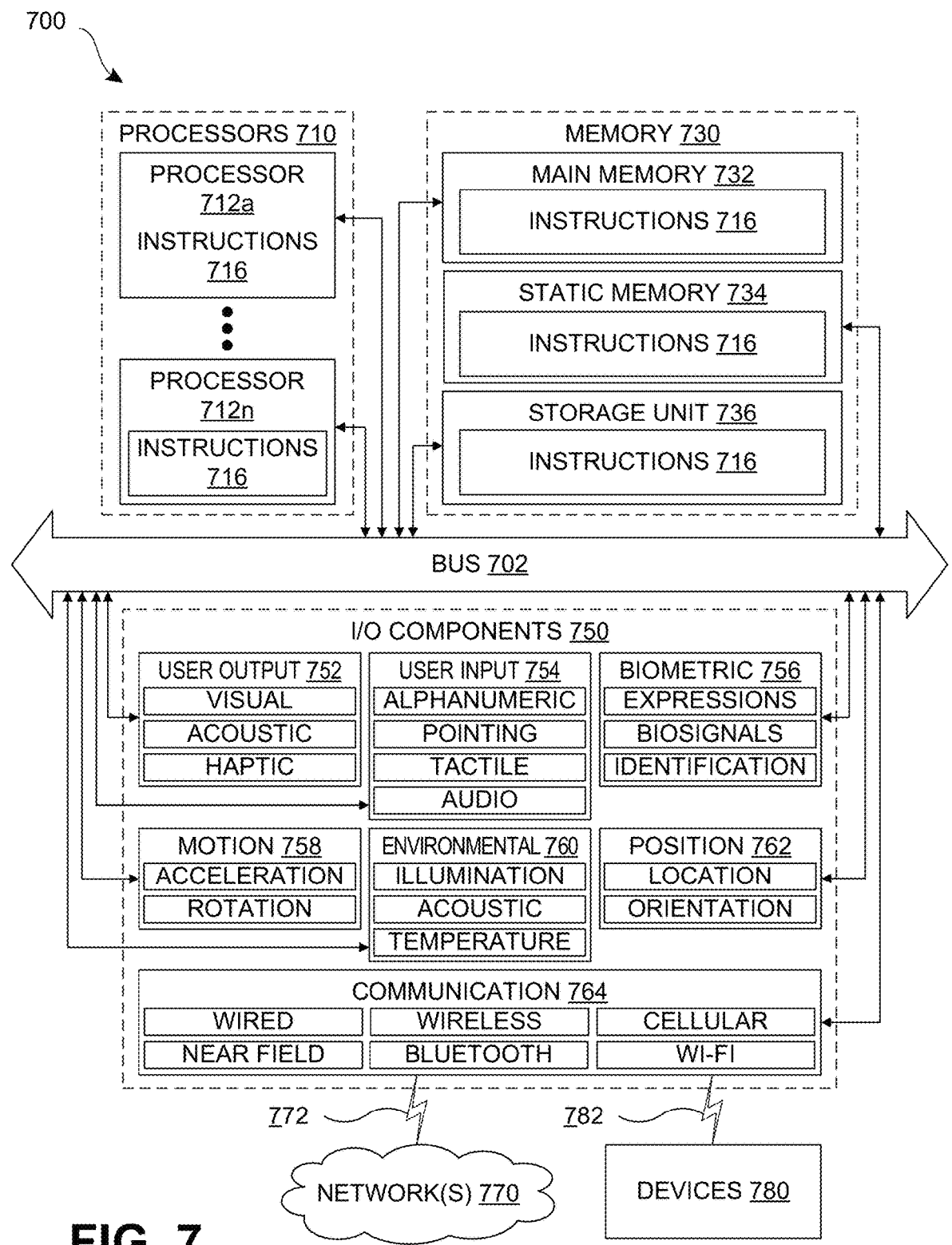
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "computer-readable medium" refers to a device able to temporarily or permanently store instructions and data that cause machine 700 to operate in a specific fashion. The term "computer-readable medium," as used herein, may include both communication media (e.g., transitory electrical or electromagnetic signals such as a carrier wave propagating through a medium) and storage media (i.e., tangible and/or non-transitory media). Non-limiting examples of a computer readable storage media may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable storage media" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "computer-readable storage media" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
receiving a search request containing one or more terms for performing a search;
providing the one or more terms to a search engine for conducting a search;
receiving a search results index containing a list of a plurality of documents from the search engine, each of the plurality of documents corresponding to at least one of the one or more terms or to one or more other terms associated with the at least one of the one or more terms;
accessing a plurality of properties associated with at least one of the plurality of documents, the plurality of properties including a user category associated with the at least one of the plurality of documents;
calculating a relevance score for the at least one of the plurality of documents based on at least one of the plurality of properties;
selecting a subset of the plurality of documents for presentation based at least on the calculated relevance score; and
providing the subset of the plurality of documents for presentation.

Item 2. The data processing system of item 1, wherein the plurality of properties includes at least one of a level of activity associated with the at least one of the plurality of documents, a lifecycle stage associated with the at least one of the plurality of documents, and one or more relevant activities performed on the at least one of the plurality of documents.

Item 3. The data processing system of item 2, wherein the one or more relevant activities performed on the at least one of the plurality of documents includes an activity time and a user ID for each of the one or more relevant activities.

Item 4. The data processing system of any of item 3, wherein the one or more relevant activities are activities that indicate a level of relevance for the at least one of the plurality of documents.

Item 5. The data processing system of item 2, wherein each of the level of activity, the lifecycle stage, and the one or more relevant activities are associated with a weight.

Item 6. The data processing system of any of the preceding items, wherein the user category associated with the at least one of the plurality of documents includes at least one of a user ID associated with the user category, a session time associated with the user category and a session duration associated with the user category.

Item 7. The data processing system of item 6, wherein at least one of the session time and the session duration are associated with a weight used in calculating the relevance score for the document.

Item 8. A method for intelligently ranking search results comprising:
receiving a search request containing one or more terms for performing a search;
providing the one or more terms for conducting a search;
receiving a search results index containing a list of a plurality of documents, each of the plurality of documents corresponding to at least one of the one or more terms or to one or more other terms associated with the at least one of the one or more terms;
accessing a plurality of properties associated with at least one of the plurality of documents, the plurality of properties including a user category associated with the at least one of the plurality of documents;
calculating a relevance score for the at least one of the plurality of documents based on at least one of the plurality of properties;
selecting a subset of the plurality of documents for presentation based at least on the calculated relevance score; and
providing the subset of the plurality of documents for presentation.

Item 9. The method of item 8, wherein the plurality of properties includes at least one of a level of activity associated with the at least one of the plurality of documents, a lifecycle stage associated with the at least one of the plurality of documents, and one or more relevant activities performed on the at least one of the plurality of documents.

Item 10. The method of item 9, wherein the one or more relevant activities performed on the at least one of the plurality of documents includes an activity time and a user ID for each of the one or more relevant activities.

Item 11. The method of item 9, wherein each of the level of activity, the lifecycle stage, and the one or more relevant activities are associated with a weight.

Item 12. The method of any of items 8-11, wherein the relevance score is calculated based on one of the plurality of properties and on contextual information.

Item 13. The method of item 12, wherein the contextual information includes information about at least one of: people, teams, groups, or organizations associated with the user; sites or applications the user has recently used; and the degree with which the user is associated with items of the contextual information.

Item 14. The method of any of items 8-13, wherein the user category associated with the at least one of the plurality of documents includes at least one of a user ID associated with the user category, a session time associated with the user category and a session duration associated with the user category.

Item 15. A computer readable storage media on which are stored instructions that when executed cause a programmable device to:
receive a search request containing one or more terms for performing a search; providing the one or more terms for conducting a search;
receive a search results index containing a list of a plurality of documents, each of the plurality of documents corresponding to at least one of the one or more terms or to one or more other terms associated with the at least one of the one or more terms;
access a plurality of properties associated with at least one of the plurality of documents, the plurality of properties including a user category associated with the at least one of the plurality of documents;

calculate a relevance score for the at least one of the plurality of documents based on at least one of the plurality of properties;

select a subset of the plurality of documents for presentation based at least on the calculated relevance score; and provide the subset of the plurality of documents for presentation.

Item 16. The computer readable storage media of item 15, wherein the plurality of properties includes at least one of a level of activity associated with the at least one of the plurality of documents, a lifecycle stage associated with the at least one of the plurality of documents, and one or more relevant activities performed on the at least one of the plurality of documents.

Item 17. The computer readable storage media of item 16, wherein the one or more relevant activities performed on the at least one of the plurality of documents includes an activity time and a user ID for each of the one or more relevant activities.

Item 18. The computer readable storage media of item 16, wherein each of the level of activity, the lifecycle stage, and the one or more relevant activities are associated with a relevance value.

Item 19. The computer readable storage media of any of items 15-18, wherein the user category associated with the at least one of the plurality of documents includes at least one of a user ID associated with the user category, a session time associated with the user category and a session duration associated with the user category.

Item 20. The computer readable storage media of any of items 15-18, wherein the relevance score is calculated based on one of the plurality of properties and on information contained in a contextual information data structure.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

one or more processors; and a memory in communication with the one or more processors, the memory comprising executable instructions that, when executed by, the one or more processors, cause the data processing system to perform functions of:

receiving a search request containing one or more terms for performing a search;

providing the one or more terms to a search engine for conducting a search;

receiving a search results list containing a list of a plurality of documents from the search engine, each of the plurality of documents corresponding to at least one of the one or more terms;

accessing a plurality of properties associated with each of the plurality of documents, the plurality of properties including a user category associated with each of the plurality of documents;

selecting a subset of the plurality of documents for display as search results based at least on the user category; and providing the subset of the plurality of documents and the user category associated with each document in the subset of the plurality of documents for display as search results on a user interface screen, wherein the user category associated with each of the plurality of documents is determined by:

collecting data associated with a plurality of activities performed on a document by a user within a user session, analyzing the plurality of activities to identify which of a plurality of user categories the plurality of activities is associated with, and designating the identified user category as the user category associated with the document for the user session.

2. The data processing system of claim 1, wherein for one or more of the documents in the subset of the plurality of documents, information about a user who last modified or used the document is provided for display with the search results.

3. The data processing system of claim 2, wherein for one or more of the documents in the subset of the plurality of documents, a user identification associated with the user who last modified or used the document is provided for display with the search results.

4. The data processing system of claim 2, wherein for one or more of the documents in the subset of the plurality of documents, a time period associated with the user session during which the user last modified or used the document is provided for display with the search results.

5. The data processing system of claim 4, wherein for one or more of the documents in the subset of the plurality of documents, a reference to an amount of time passed since the time period is displayed with the search results.

6. The data processing system of claim 2, wherein for one or more of the documents in the subset of the plurality of documents, an activity corresponding to actions taken by the user who last modified or used the document is provided for display with the search results.

7. The data processing system of claim 1, wherein the plurality of properties includes at least one of a level of activity associated with each of the plurality of documents, a lifecycle stage associated with each of the plurality of documents, and one or more relevant activities performed on each of the plurality of documents.

8. The data processing system of claim 7, wherein for one or more of the documents in the subset of the plurality of documents, at least one of the level of activity associated with each of the plurality of documents, the lifecycle stage associated with each of the plurality of documents, and the one or more relevant activities performed on each of the plurality of documents is provided for display with the search results.

9. A method for displaying search results comprising:

receiving a search request containing one or more terms for performing a search;

providing the one or more terms to a search engine for conducting a search;

receiving a search results list containing a list of a plurality of documents from the search engine, each of the plurality of documents corresponding to at least one of the one or more terms;

accessing a plurality of properties associated with each of the plurality of documents, the plurality of properties including a user category associated with each of the plurality of documents;

selecting a subset of the plurality of documents for display as search results based at least on the user category; and providing the subset of the plurality of documents and the user category associated with each document in the subset of the plurality of documents for display as search results on a user interface screen, wherein the user category associated with each of the plurality of documents is determined by:

collecting data associated with a plurality of activities performed on a document by a user within a user session, analyzing the plurality of activities to identify which of a plurality of user categories the plurality of activities is associated with, and designating the identified user category as the user category associated with the document for the user session.

10. The method of claim 9, wherein for one or more of the documents in the subset of the plurality of documents, information about a user who last modified or used the document is provided for display with the search results.

11. The method of claim 10, wherein for one or more of the documents in the subset of the plurality of documents, a user identification associated with the user who last modified or used the document is provided for display with the search results.

12. The method of claim 10, wherein for one or more of the documents in the subset of the plurality of documents, a time period associated with the user session during which the user last modified or used the document is provided for display with the search results.

13. The method of claim 12, wherein for one or more of the documents in the subset of the plurality of documents, a reference to an amount of time passed since the time period is displayed with the search results.

14. The method of claim 10, wherein for one or more of the documents in the subset of the plurality of documents, an activity corresponding to actions taken by the user who last modified or used the document is provided for display with the search results.

15. The method of claim 9, wherein the plurality of properties includes at least one of a level of activity associated with each of the plurality of documents, a lifecycle stage associated with each of the plurality of documents, and one or more relevant activities performed on each of the plurality of documents.

16. The method of claim 15, wherein for one or more of the documents in the subset of the plurality of documents, at least one of the level of activity associated with each of the plurality of documents, the lifecycle stage associated with each of the plurality of documents, and the one or more relevant activities performed on each of the plurality of documents is provided for display with the search results.

17. A non-transitory computer readable storage media on which are stored instructions that when executed cause a programmable device to perform function of:

receiving a search request containing one or more terms for performing a search;

providing the one or more terms to a search engine for conducting a search;

receiving a search results list containing a list of a plurality of documents from the search engine, each of the plurality of documents corresponding to at least one of the one or more terms;

accessing a plurality of properties associated with each of the plurality of documents, the plurality of properties including a user category associated with each of the plurality of documents;

selecting a subset of the plurality of documents for display as search results based at least on the user category; and providing the subset of the plurality of documents and the user category associated with each document in the subset of the plurality of documents for display as search results on a user interface screen, wherein the user category associated with each of the plurality of documents is determined by:

collecting data associated with a plurality of activities performed on a document by a user within a user session, analyzing the plurality of activities to identify which of a plurality of user categories the plurality of activities is associated with, and designating the identified user category as the user category associated with the document for the user session.

18. The non-transitory computer readable storage media of claim 17, wherein for one or more of the documents in the subset of the plurality of documents, information about a user who last modified or used the document is provided for display with the search results.

19. The non-transitory computer readable storage media of claim 18, wherein for one or more of the documents in the subset of the plurality of documents, a user identification associated with the user who last modified or used the document is provided for display with the search results.

20. The non-transitory computer readable storage media of claim 17, wherein for one or more of the documents in the subset of the plurality of documents, a time period associated with the user session during which the user last modified or used the document is provided for display with the search results.

* * * * *